United States Patent

Janssen et al.

[15] 3,701,902
[45] Oct. 31, 1972

[54] DUAL DETECTOR COMPENSATED DENSITY WALL LOGGING SYSTEM

[72] Inventors: Hermann W. Janssen, Kiel, Germany; James F. Mooring, Houston, Tex.

[73] Assignee: Dresser Industries, Inc., Dallas, Tex.

[22] Filed: June 9, 1971

[21] Appl. No.: 151,520

Related U.S. Application Data

[62] Division of Ser. No. 652,115, July 10, 1967, Pat. No. 3,617,746.

[52] U.S. Cl. .........................250/83.3 R, 250/83.6 W
[51] Int. Cl. ............................G01v 5/00, G01t 1/16
[58] Field of Search ..................250/83.3 R, 83.6 W

[56] References Cited

UNITED STATES PATENTS 3,321,625  5/1967  Wahl.................250/83.6 W X
3,508,439  4/1970  Alger.................250/83.6 W X

OTHER PUBLICATIONS

The Dual Spacing Formation Density Log, by Wahl et al., from Society of Petroleum Engineers, Dec. 1964, pgs. 1,411–1,416.

Primary Examiner—Archie R. Borchelt
Attorney—Mason, Kolehmainen, Rathburn & Wyss

[57] ABSTRACT

A density well logging compensation system wherein the outputs of the two detectors, which are spaced different distances from a gamma ray source, are applied to temperature compensated logarithmic amplifiers the outputs of which are compared to derive a correction signal which is employed to correct the output of one of the detectors to give true formation density. In connection with the spine and ribs plot of such a system, provision is made for adjusting both the spine angle and the rib angle so that the compensation system may be employed with density logging tools of different geometries and physical dimensions. Furthermore, provision is made for compensating for curvature of the rib with increasing mudcake thickness. Facilities are also provided for holding the source end of the logging instrument against the borehole wall to minimize errors in the compensated output of the system.

2 Claims, 6 Drawing Figures

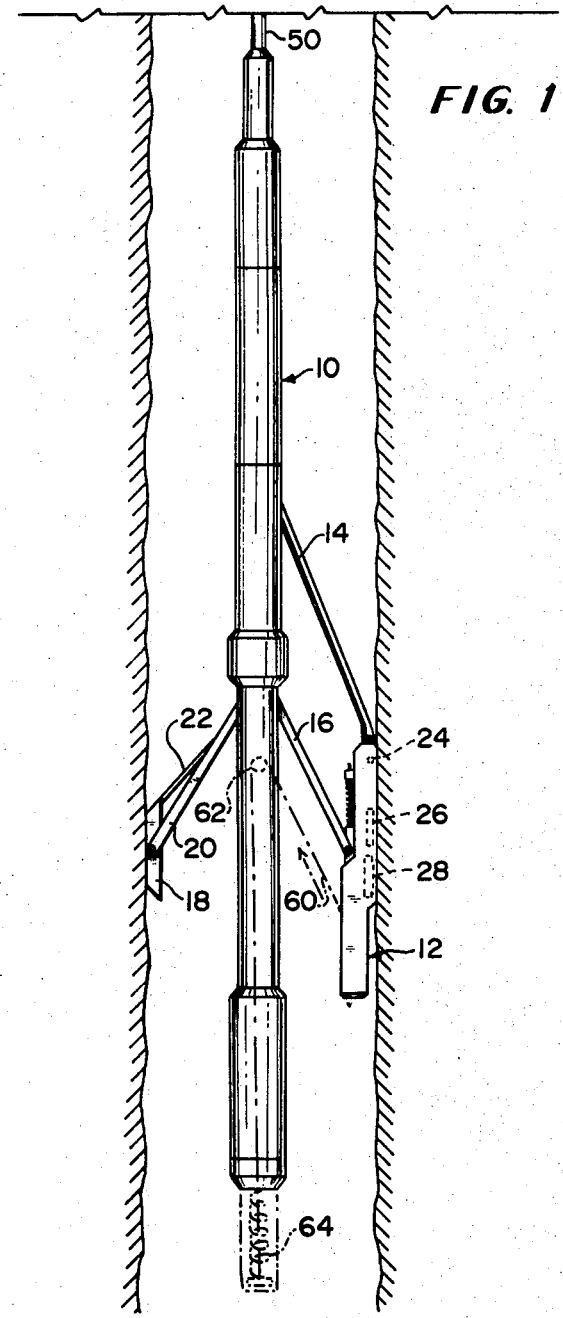
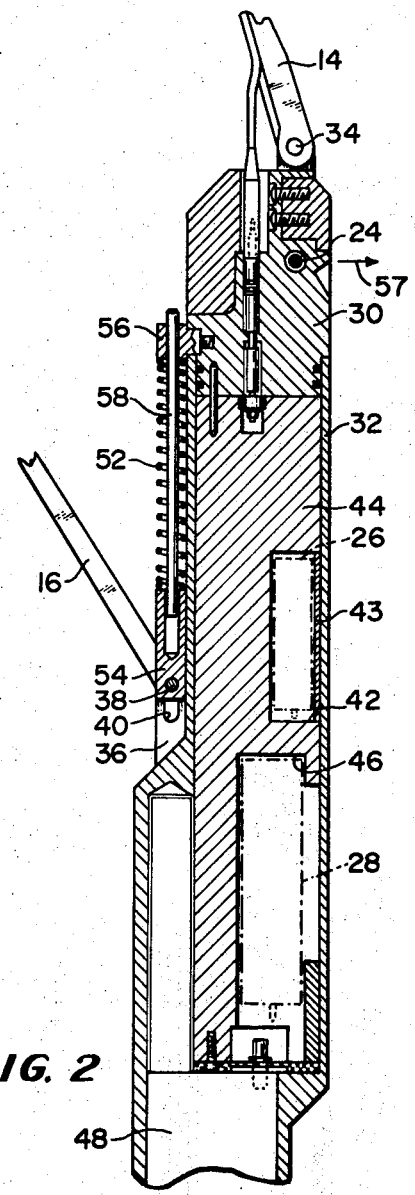
FIG. 1
FIG. 2

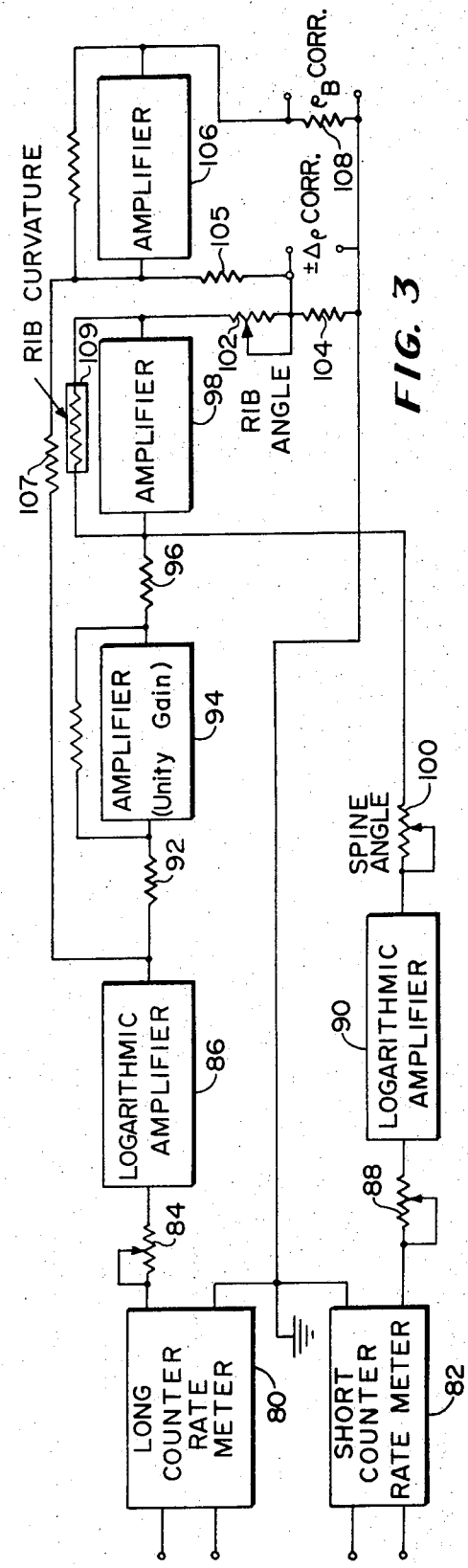
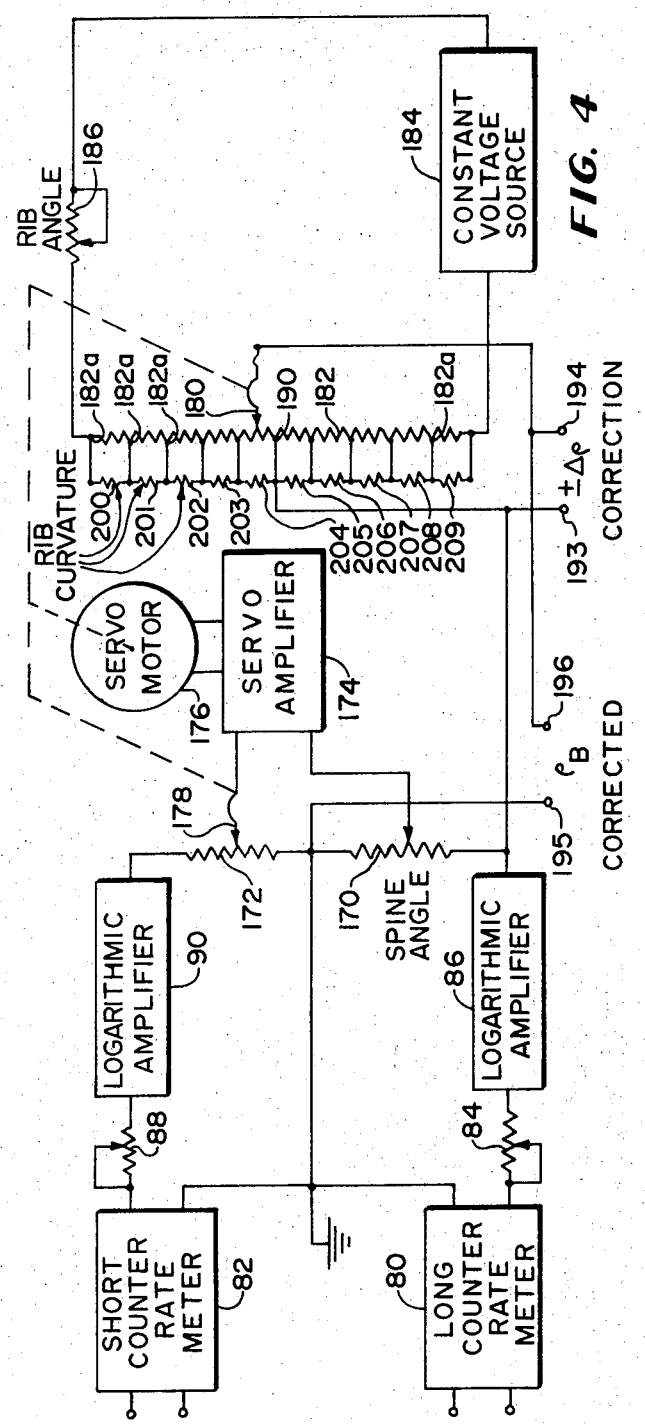
FIG. 3
FIG. 4

3,701,902

DUAL DETECTOR COMPENSATED DENSITY WALL LOGGING SYSTEM

This is a division of application Ser. No. 652,115, filed July 10, 1967, now U.S. Pat. No. 3,617,746.

The present invention relates to well logging methods and apparatus, and, more particularly, to compensation methods and apparatus whereby the effects of mud, mud cake on the wall of the borehole, and wall rugosity, on the true physical charactistic which is being measured may be substantially eliminated. While the invention has particular application to and will be described in connection with density logging, wherein a gamma ray source is employed and true formation density is the desired physical quantity to be measured, it is to be understood that the compensation apparatus of the present invention may also be employed in electric logging, wherein a current electrode acts as the source and true formation resistance is the desired quantity, and in radioactivity logging wherein a neutron source is employed and true formation porosity is the desired quantity. In each of these types of well logging the characteristic variation of the measured quantity with respect to distance from the source is obtained and due to the distribution or spreading law of the source, the signals obtained are not a linear function of the particular physical property of the formations which is desired. The present invention provides compensation apparatus which may be used with any of these types of well logging systems to eliminate the effects of mud cake, wall rugosity and similar environmental effects.

In prior art density logging systems it has been proposed to employ two detectors, spaced at different distances from a gamma ray source, and to utilize the outputs of the two detectors to produce a correction factor which is applied to the long spacing detector output to provide a corrected bulk density reading. One such arrangement is described in an article entitled "The Dual Spacing Formation Density Log" by J. S. Wahl et al., appearing in the December 1964 issue of the Journal of Petroleum Technology. In this article a so-called spine and ribs plot is shown from which the influence of different mud cake weights and cake thickness on the density reading can be determined. A correction value can then be derived and added to the apparent density reading of the long spacing counter to obtain the corrected bulk density of the formation.

In actual practice we have found that due to machining tolerances, variations in size and spectral sensitivity of the detectors and other factors it is very difficult to produce two density logging tools whose spine and ribs plot will have the same spine angle and the same rib angle. Furthermore, as shown in the above article, the ribs are curved and depart further and further from straight lines as mud cake thickness increases. Accordingly, if correction is made based on the assumption that the rib is straight, the corrected bulk density reading may be off by a considerable amount in a region having a thick mud cake. This is particularly true where there is a large density contrast, i.e., where the true formation density and the mud cake density are widely different. A further difficulty which has been experienced with density logging tools of the type described in the Wahl et al. article is that any separation of the source end of the logging unit from the borehole wall introduces errors in the compensation system which are considerably larger than if the detector end of the logging unit becomes separated. Also, adverse effects within the compensation itself may be experienced due to the high ambient temperature to which the unit is subjected while logging.

It is therefore, an object of the present invention to provide a new and improved compensation arrangement for a dual spacing well logging system in which one or more of the above described disadvantages of the prior art arrangements is eliminated.

It is another object of the present invention to provide a new and improved compensation arrangement for a dual spacing well logging system which can be adjusted for different tool geometries and spacings.

It is a further object of the present invention to provide a new and improved compensation arrangement for a dual spacing well logging system in which correction for rib curvature is automatically included in the corrected reading.

It is a still further object of the present invention to provide a new and improved computer arrangement for a dual spacing density logging system in which adjustment may be made for different spine and rib angles to adapt the computer to different tool geometries.

It is another object of the present invention to provide a new and improved density logging system employing a gamma ray source wherein an increased pressure is applied to the source end of the logging unit so that the source end of the unit is maintained in engagement with the borehole wall.

Briefly, in accordance with the present invention, a particular density logging tool is first calibrated in a pit with known formation densities and with mud cake simulators between formation and pad of known density but varying thickness. From this is obtained a spine and ribs plot for this particular logging tool. The tool is then calibrated at the well site by means of a field calibrator unit which employs separate gamma ray sources and gamma ray absorbers which have been ground to correspond to specific points on this particular spine and ribs plot. The compensation apparatus is then adjusted to the correct spine angle and to the correct rib angle. The apparatus is also arranged to compensate for medium rib curvature as determined from the spine and ribs plot. The tool is then calibrated to compute automatically the true bulk density and the density correction required by the mud cake and other environmental factors during the logging operation and these two readings are recorded during the logging operation. According to a further phase of the invention, a force is exerted against the source end of the pad unit to hold it tightly against the borehole wall despite variations in borehole diameter so that true correction and bulk density readings will be obtained and errors due to standoff of the source end of the unit from the wall of the borehole are minimized.

The invention, both as to its organization and manner of operation, together with further objects and advantages, will best be understood by reference to the following detailed description taken in conjunction with the accompanying drawings, wherein:

FIG. 1 shows a density logging system embodying the principles of the present invention;

FIG. 2 is a side view, in section, of the pad portion of the subsurface unit of FIG. 1;

FIG. 3 is a schematic diagram of a computer module employed in the surface equipment of FIG. 1;

FIG. 4 is a schematic diagram of an alternative computer module which may be employed in the system of FIG. 1;

Figure 5:
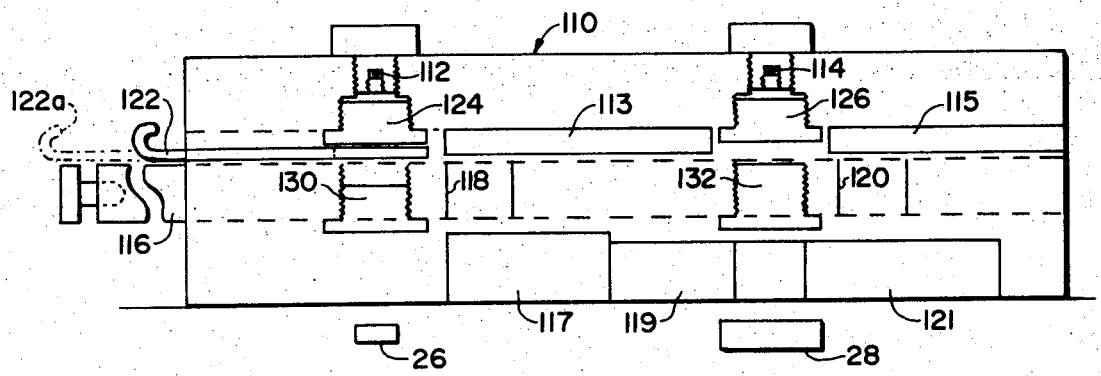
FIG. 5 is a front view, partly diagrammatic, of a field calibrator unit which is used with the system of FIG. 1 to adjust the computer module thereof.

Referring now to the drawings, the present invention is therein illustrated in conjunction with a density logging system in which the subsurface unit 10 is provided with an extendable pad unit indicated generally at 12, the pad unit 12 being pivotally connected to the main unit 10 by means of a pair of arms 14 and 16. A back-up plate 18 is also pivotally connected to the unit 10 by means of the arms 20 and 22. Preferably, the arms 16 and 20 are urged outwardly under spring pressure so that the pad unit 12 and back up plate 18 are held against the sides of the borehole wall during the logging operation. However, the arms 14, 16, 20 and 22 may be actuated so that the pad units 12 and 18 are withdrawn into the shell of the unit 10 for passage through the borehole without interference.

In the pad unit 12, a source of gamma rays 24 is positioned near the top end of the unit, a first relatively short detector 26 is positioned somewhat below the source 24 and a second, longer detector 28 is positioned below the detector 26. More particularly, referring to FIG. 2, the source 24 is positioned in the upper end of a shielding member 30 which is mounted in the upper end of a housing 32. The bottom end of the arm 14 is pivotally mounted to the unit 12 by means of the pin 34. The bottom end of the arm 16 is pivotally connected to a flange 36 on the housing 32 by means of a pin 38 which slides in a vertically extending slot 40 in the flange 36.

The short spacing detector 26 may comprise any suitable type of gamma ray detector and is positioned in a recess 42 within a main shielding member 44. Similarly, the long spacing detector 28 may comprise any suitable type of gamma ray detector and is positioned within the recess 46 in the shield 44. The necessary circuitry for the detectors 26 and 28 is contained in a cartridge 48 positioned in the bottom end of the housing 32 and the electrical pulse type signals developed by the detectors 26 and 28 may also be suitably processed for application to the cable 50 for transmission to the earth's surface by means of suitable electronic circuitry contained in the cartridge 48. For example, this electronic circuitry may correspond to the arrangements shown in Rabson et al. application Ser. No. 449,210, filed Apr. 19, 1965, now U.S. Pat. No. 3,309,657, and Wilson et al. application Ser. No. 449,495, filed Apr. 20, 1965, insofar as the development of suitable pulse type signals and the transmission thereof to the earth's surface is concerned.

In accordance with an important feature of the invention, the pad unit 12 is provided with means for exerting additional pressure on the top end of the unit 12 so that the source end of this unit will be held tightly against the borehole wall during the logging operation. The arm 16 is spring biased outwardly and acts to maintain the entire pad unit 12 against the borehole wall. However, since the arm 16 exerts its force somewhat near the middle of the unit 12 and is slidably mounted in the slot 40, the upper end of the unit 12, which contains the source 24, may under certain conditions, be pushed away from the borehole wall. It has been found that movement of the source end of the unit 12 away from the borehole wall produces much more error which is less readily compensated than a corresponding movement of the bottom or detector end of the unit 12. Accordingly, a coil spring 52 is provided to exert an overpressuring force on the upper end of the unit 12. The compression spring 52 is positioned between a block 54 and a stop member 56 secured to the housing 32. The block 54 is pivotally mounted on the pin 38 and hence can move within the slot 40 as the relative positions of the arms 14 and 16 vary. Since the upper arm 14 is pivotally mounted to the housing by the pin 34, the force developed by the spring 52 is exerted in the direction of the arrow 57 in FIG. 2 and acts to hold the source end of the unit 12 in intimate contact with the borehole wall. A rod 58 is secured at one end to the block 54 and extends through a clearance opening in the stop member 56, the rod 58 acting to guide the spring 52 so that its force will be applied against the stop 56.

It will be noted that the above described overpressuring spring 52 exerts a force on the upper end of the unit 12 which does not vary with borehole diameter. This is particularly desirable because the overpressuring force thus tends to be constant with different borehole conditions. However, it will be appreciated that other arrangements may also be employed to develop this overpressuring force. One such arrangement is shown in dotted lines in FIG. 1 and comprises a cable 60 which is attached to the housing of the unit 12 below the connection point of the arm 16. The cable 60 extends over a pulley 62 in the unit 10 and downwardly to the bottom end of this unit where a compression spring 64 exerts a downwardly directed force on the cable 60. This arrangement may be used in place of the spring 52 to exert an outwardly directed force on the upper end of the pad unit 12. It will also be obvious that other arrangements may be employed to develop the desired overpressuring force.

Pulse type signals which are developed by the detectors 26 and 28 are suitably amplified and shaped in the circuitry contained in the cartridge 48 and are then transmitted over the cable 50 to the surface equipment. This equipment includes suitable amplifiers and pulse separation circuits so that pulses corresponding to the output of the large spacing detector 38 may be separated from pulses corresponding to the short spacing detector 26. This pulse separation may, for example, be performed by means of the arrangement described in the above identified Rabson et al. patent. However, it will be understood that any other suitable arrangement for transmitting pulses corresponding to the detectors 26 and 28 to the earth's surface and separating the same may be employed insofar as the present invention is concerned.

After the two sets of pulses have been separated, they are applied to individual counting rate meters which produce output signals varying in accordance with the rate of occurrence of the corresponding pulses, this portion of the surface equipment being shown by the block 70 in FIG. 1. The outputs of the counting rate meters are then applied to a computer module 72 which functions to produce a corrected density signal corresponding to the long spacing detector 28 and a correction signal which varies with mud cake thickness and density. These two signals are then recorded on a multiple trace recorder 74 to provide a density log corresponding to true formation dens. $\rho B$ and a correction log giving $\pm\Delta\rho$.

Referring now to FIG. 3, the computer module 72 is illustrated in this figure in connection with the counting rate meters. More particularly, the long spacing detector counting rate meter is indicated at 80 and the short spacing detector counting rate meter is indicated at 82. It will be understood that pulses corresponding to each detector, which may be standardized in amplitude and width, are applied to the input of each counting rate meter. The output of each counting rate meter is not a linear function of density since the gamma ray absorption law is an exponential law. Accordingly, the output of each counting rate meter is applied to a logarithmic amplifier wherein the counting rate signal is converted into the logarithm of the input, i.e., a signal which varies linearly with apparent formation density. Thus, the output of the meter 80 is connected through a calibration potentiometer 84 to the input of a logarithmic amplifier 86 and the output of the meter 82 is connected through a calibration potentiometer 88 to the input of a logarithmic amplifier 90. The amplifiers 86 and 90 thus provide at their outputs, signals which are proportional to the logarithms of the respective detector counting rates.

While the logarithmic amplifiers 86 and 90 may be of any suitable design, it is important that these amplifiers be highly compensated for changes in temperature, due to the wide variations in ambient temperature experienced in well logging. Thus, amplifiers employing simply back-to-back diodes or a single transistor in the feedback path have been found generally to be unsatisfactory. One type of logarithmic amplifier which has been found satisfactory to provide the necessary temperature compensation is described in the Fairchild Semiconductor Application Bulletin No. APP–124, entitled "Designing with off the shelf linear microcircuits" by R. J. Widlar and J. N. Giles. In this logarithmic amplifier, a matched pair of transistors is employed in conjunction with two operational amplifiers to provide a logarithmic output which is highly stabilized with respect to temperature. Temperature sensitive resistors may also be used in conjunction with such an amplifier if further temperature compensation is required.

The outputs of the logarithmic amplifiers 86 and 90 are compared to provide a correct signal which is then summed with the logarithmic output proportional to the long spacing counter to provide a corrected density reading corresponding to true bulk density. Furthermore, in accordance with an important feature of the invention facilities are provided for adjusting both the spine and rib angles to correspond to the particular geometry of the tool at particular points on the spine and ribs plot of that tool so that different tool geometries may be accommodated.

More particularly, the output of the logarithmic amplifier 86 is connected through an isolating resistor 92 to an amplifier 94 which is in the form of an operational amplifier having unity gain and serves as a phase inverter for the output of the amplifier 86. This polarity of phase inversion is required so that when the outputs of the amplifiers 86 and 90 are added together the net output will be zero upon an appropriate spine angle adjustment, as will be described hereinafter. However, if the correct polarity output is available from the amplifier 86 the amplifier 94 may be eliminated.

The output of the amplifier 94 is supplied through a resistor 96 to the input of a summation amplifier 98 which also may comprise any suitable form of operational amplifier arranged to provide unity gain. The output of the logarithmic amplifier 90 is supplied through a spine angle adjustment potentiometer 100 to the input of the amplifier 98, it being understood that an input resistor (not shown) is connected from the junction of the resistor 96 and the potentiometer 100 to ground in the input of the amplifier 98. The resistor 96 and potentiometer 100 thus act as voltage dividers to the input of the amplifier 98. The summation output of the amplifier 98 is then supplied to a rib angle potentiometer 102 and a resistor 104 connected in series to ground, the voltage across the resistor 104 being employed as a density correction signal. This density correction signal will vary with mudcake thickness and mudcake density, as well as other borehole wall environmental factors, and is supplied to the density correction galvanometer of the recorder 74. The output of the amplifier 86 is also supplied through a resistor 107 to the input of an amplifier 106 and the density correction signal developed across the resistor 104 is also supplied through the resistor 105 to the input of the amplifier 106. The output of the amplifier 106 is developed across the resistor 108 and is supplied to the corrected bulk density galvanometer in the recorder 74.

In considering the manner in which the computer module of FIG. 3 may be adjusted to accommodate different spine and rib angles for density logging tools having different geometries, reference is now made to FIG. 5 which shows, in diagrammatic form, a field calibration jig arrangement which is employed to calibrate the computer module of a particular logging instrument. This field calibration jig comprises a unit indicated generally at 110 which is arranged to be positioned on the side of the housing 32 (FIG. 2) in such manner that a pair of gamma ray sources 112 and 114 are positioned over the short spacing detector 26 and the long spacing detector 28, respectively. During this calibration procedure the gamma ray source 24 is removed. Furthermore, it is pointed out that the sources 112 and 114 are both positioned in the middle of the effective length of the respective detectors 26 and 28 to provide for very accurate calibration. If a single source is used to calibrate both detectors very slight changes in spacing affect both detectors and result in inaccurate calibration.

A slideable drawer 116 is mounted in the unit 110 and is provided with a pair of openings 118 and 120 therein which are spaced apart by a distance corresponding to the spacing of the sources 112 and 114. The drawer 116 may be pulled out of the unit 110 by an amount sufficient to place the openings 118 and 120 in the path between the sources 112, 114 and the detectors 26, 28. A second calibration element 122 is also slideably mounted in the unit 110 and is initially moved outwardly to the position shown in dotted lines at 122a in FIG. 5 at the start of calibration. Accordingly, at the start of the calibration procedure both of the drawings 116 and 122 are moved to their lefthand positions as viewed in FIG. 5. In this position a first pair of absorbers 124 and 126 are positioned between the sources 112 and 114 and the detectors 26, 28 respectively. A pair of lead shields 113 and 115 are positioned on either side of the absorber 126 and lead shields 117, 119 and 121 are positioned adjacent the detector side of the unit 110 to define a collimated opening for gamma rays from the source 114 midway of the effective length of the detector 28. In this manner gamma ray interaction between the sources 112, 114 and the detectors 26, 28 is avoided and the accuracy of calibration is increased. The absorbers 124 and 126 are precisely ground so that the counting rates produced by the detectors 26 and 28 are exactly the same as when this particular logging instrument was positioned in a homogeneous formation having a density of 2.1 at the time the spine and ribs plot of this particular instrument was made. In this connection it will be understood that any other desired point on the spine and ribs plot may be utilized as a calibration point insofar as the procedure of the present invention is concerned.

The corrected bulk density galvanometer in the recorder 74 is first mechanically adjusted to read 2.1 on its associated density scale with no output from the rate meters 80 and 82. The field calibrator unit 110 corresponding to the particular tool being calibrated is then placed over the housing 32 (with the source 24 removed) with the sources 112 and 114 in the middle of the effective length of the counters 26 and 28 and only the absorbers 124 and 126 in place. The logarithmic amplifiers 86 and 90 may now be adjusted to standard counting rates. More particularly, with the correct number of gamma rays being received by counter 26 for the 2.1 density point on the spine, the potentiometer 84 is then adjusted so that the input to the amplifier 86 from the rate meter 80 is exactly balanced by an internal bias within the amplifier 86 and the output from the amplifier 86 is zero. In a similar manner the amplifier 90 is adjusted to standard counting rate by adjustment of the potentiometer 88 until the output of the amplifier 90 is zero. Since zero voltage is being developed by the amplifiers 86 and 90, zero voltage is also being applied to the bulk density galvanometer which will then read 2.1 since it has been mechanically adjusted to this point. This means that the instrument is now calibrated to the 2.1 density point on the spine and ribs plot of that particular instrument.

This zero point is now used as a pivot point to adjust for the proper spine angle. More particularly, drawer 116 is now moved inwardly so as to place a second pair of absorbers 130 and 132 between the radiation sources 112, 114 and the detectors 26, 28. The absorbers 130 and 132 are chosen so that they will give sufficient additional absorption to correspond to a density reading of 2.6 on the spine and ribs plot of that particular instrument, as determined initially from pit readings on that instrument on a homogeneous formation of that density. When the drawer 116 is moved inwardly a voltage is produced across the resistor 108 and is supplied to the corrected bulk density galvanometer. This voltage should correspond to the 2.6 point on the spine. However the additional absorption provided by the absorbers 130, 132 may not produce a point on the spine of the spine and ribs plot of the particular tool unless the spine angle potentiometer 100 is adjusted properly. In this connection it is pointed out that due to machining tolerances, variations in assembly of parts, and other factors, no two logging tools will have exactly the same spine angle. This point may be illustrated by referring to FIG. 6. Thus, referring to this figure, a particular logging instrument may have a spine angle alpha of 70° which gives the spine 140 shown in full lines. However, other instruments may have spine angles which vary from 65°, corresponding to the spine shown in dotted lines at 141 in FIG. 6, to 75°, corresponding to the spine 142 also shown in dotted lines in FIG. 6. These three spines have been shown in FIG. 6 as passing through the same pivot point 144 on the spine corresponding to a density reading of 2.1, simply because all of the logging instruments are calibrated to this same pivot point in accordance with the described calibration procedure. However, it will be understood that any other suitable pivot point along the spine may be used.

Figure 6:
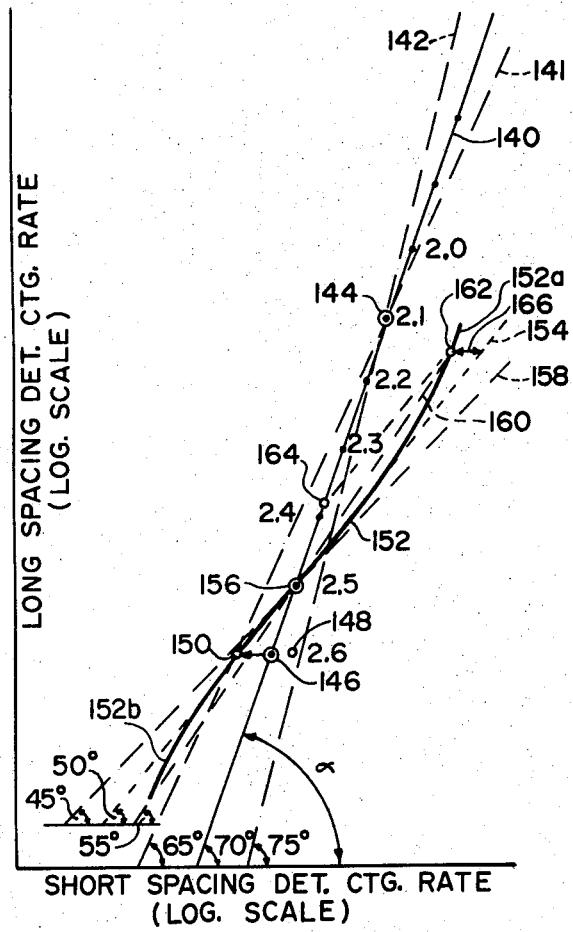
FIG. 6 is a spine and ribs plot of the density logging unit of FIG. 1 and illustrating possible variations in spine and rib angle with different tool geometries.

Referring still to FIG. 6, and assuming that the instrument being calibrated has a spine angle of 70°, when the absorbers 130 and 132 are in position, a density reading corresponding to 2.6 on the spine should be obtained, i.e., the point indicated at 146 in FIG. 6. However, if the spine angle is not properly adjusted, the reading obtained with the absorbers 130 and 132 may be off of the spine by a certain amount as indicated by the point 148 in FIG. 6. However any point off of the spine itself represents a nonhomogeneous formation and should produce a correction signal. Stated differently, if the correction signal is adjusted to zero then the operator is assured that the 2.6 density point is on the spine. To this end, the spine angle potentiometer 100 is now adjusted until there is zero output voltage across the resistor 104, i.e., zero voltage is supplied to the correction signal galvanometer in the recorder 74. This voltage is zero when the ratio of the resistor 96 to the spine angle potentiometer 100 is equal to the tangent of the spine angle alpha.

When the spine angle potentiometer 100 has been adjusted to give zero voltage across the resistor 104, the output of the amplifier 90, as it appears at the input of the amplifier 98, has been electrically adjusted to equal the output of the amplifier 86 which is equivalent electrically to a 45° angle. Accordingly, by simply adjusting the potentiometer 100 to a value such that zero output voltage is supplied to the correction signal galvanometer, the operator is assured that the 2.6 density point falls at the point 146 shown in FIG. 6 which is on the spine. However, since a definite voltage is now being supplied to the resistor 108 corresponding to the change in density from the 2.1 point to the 2.6 point, the bulk density galvanometer will have a particular reading in the neighborhood of 2.6. The sensitivity of this galvanometer is then electrically adjusted so that it reads exactly 2.6 with the absorbers 130, 132 in place and after the spine angle potentiometer 100 has been adjusted.

In order to calibrate for rib angle correction, the slide 122, which has heretofore been positioned to the left of the absorber 124, is moved inwardly to the position shown in full lines in FIG. 5 so that it adds a small additional absorption for the gamma rays being received by the detector 26 from the source 112. However the slide 122 does not affect the absorption of gamma rays form the source 114 so that the counting rate of the detector 28 does not change. The absorption provided by the slide 122 is calibrated so that it produces a change in the counting rate of the detector 26 which corresponds to a point on the spine and ribs plot of that particular instrument which, when compensated, falls at 2.5 on the spine, i.e., at 0.1 density from the previous calibration point of 2.6 at which the spine angle was adjusted. Accordingly, when the slide 22 is moved inwardly it shifts the point 146 to the left horizontally to the point 150 shown in FIG. 6. The point 150 in FIG. 6 has been shown as being located on the rib 152, shown in full lines in FIG. 6 and the central portion of the rib 152 corresponds to a rib angle of 50° with respect to the horizontal, as shown by the dotted line 154.

If the rib angle potentiometer 102 is correctly adjusted for a rib angle of 50°, then the corrected output signal across the potentiometer 108 corresponds exactly to the point 156 on the spine 140 and corresponds to a density of 2.5, i.e., 0.1 less density due to the insertion of the slide 122. However, the rib angles of various instruments may vary over a relatively wide range of from 45° to 55°. Thus, the rib angle of one particular logging instrument may be 45°, as indicated by the rib 158 shown in dotted lines in FIG. 6. On the other hand the rib angle may be 55°, as shown in dotted lines at 160. If the rib angle is incorrect, the bulk density reading, i.e., the voltage developed across the resistor 108, will not read 2.5 but will read some other value such as 2.45 or 2.55. The rib angle potentiometer 102 is then adjusted until the bulk density galvanometer reading is exactly 2.5. This means that the correction required by the slide 122, i.e., a 0.1 density change, has been exactly compensated. Since a correction signal is now being produced, the correction galvanometer will have a certain reading. However this reading may or may not be exactly equal to 0.1. Accordingly, the sensitivity of the correction signal galvanometer is electrically adjusted so that the correction signal is exactly 0.1. In this connection it is pointed out that the correction signal galvanometer is usually arranged to record within the range of the corrected bulk density galvanometer in the recorder 74. Accordingly, the correction signal galvanometer is initially mechanically adjusted to a zero position at an unused portion of the range of the bulk density galvanometer with no electrical input to the correction signal galvanometer.

It will be noted from FIG. 6 that the rib 152 follows the straight line 154 corresponding to a rib angle of 50 degrees only for a short distance on either side of the spine and thereafter the rib 152 curves outwardly away from the theoretical straight line rib 154, as shown by the upper portion 152a and the lower portion 152b of the rib 152. With increasing mudcake thickness and higher density contrast, it will be evident that the correction afforded by a simple summation of the outputs of the amplifiers 86 and 90, even though adjusted for the correct spine and rib angles, will be incorrect. Thus, if the mudcake thickness is equal to the point 162 on the rib 152 and a straight line rib correction is made, a density reading at the point 164 will be obtained which is approximately equal to a corrected density reading of 2.4 instead of the desired 2.5. In accordance with a further feature of the invention, the amplifier 98 is arranged to compensate for a medium or average rib curvature. More specifically, the amplifier 98 is preferably an operational amplifier having a suitable feedback arrangement to provide unity gain. However, included in the feedback path of the amplifier 98 is an amplitude sensitive network, indicated generally at 109, which provides a feedback voltage to the input of the amplifier 98 which varies with the amplitude of the signal appearing at the output of the amplifier 98, i.e., the correction signal produced across the resistor 104. Thus, as larger and larger correction signals are produced at the output of the amplifier 98, corresponding to an increasing mudcake thickness, the network 109 reduces feedback so that a larger correction, indicated by the arrow 166 in FIG. 6, is added. Accordingly, the corrected density signal produced across the resistor 108 will now correspond to the desired value of 2.5 rather than 2.4. In this connection it will be understood that curvature of the ribs will vary at different points along the spine and the compensation afforded by the rib curvature network 109 is arranged to provide a medium rib curvature which will produce at least a partial correction for large mudcake thicknesses at any point along the spine.

In FIG. 4 there is shown an alternative computer module which may be employed in place of the arrangement shown in FIG. 3. Briefly considered, the arrangement of FIG. 4 employs a servo amplifier and adjustable potentiometer arrangement to provide the desired signals corresponding to corrected bulk density $\rho\beta$ and the $\pm\Delta\rho$ correction. In the arrangement of FIG. 4 the counting rate meters 80, 82 and logarithmic amplifiers 86 and 90 are the same as in FIG. 3 and have been given corresponding reference numerals. In addition, the calibration potentiometers 84 and 88 are similar to those of FIG. 3 and are employed in the same manner during the calibration procedure.

The output of the logarithmic amplifier 86 is connected to a spine angle adjustment potentiometer 170 and the output of the logarithmic amplifier 90 is supplied to a potentiometer 172. The movable arms of the potentiometers 170 and 172 are connected as the two opposed polarity inputs to a servo amplifier 174 which is arranged to drive a servo motor 176. The servo motor 176 is mechanically connected to drive the arm 178 of the potentiometer 172 and is also arranged to drive the movable arm 180 of a potentiometer 182. A constant voltage source 184 is arranged to supply current to the potentiometer 182 in series with an adjustable rib angle potentiometer 186.

In order that the servo amplifier 174 may adjust the arm 178 for positive and negative corrections corresponding to mudcakes of different densities relative to the formation density, the midpoint of the potentiometer 172 is chosen as the operating point for the arm 178. The arm of the spine angle potentiometer 170 is then adjusted to adapt the computer module to the particular spine angle of the instrument being calibrated. When this has been done, the input from ground to the arm 178 of the potentiometer 172 is equal to ($\Delta \log C_S$)/2 and the input from ground to the arm of the potentiometer 170 is equal to ($\Delta \log C_L$)/(2 tan $\alpha$) where $\alpha$ is the spine angle of the particular instrument being calibrated and $C_S$ and $C_L$ are the short spacing counting rate and the long spacing counting rate, respectively.

The computer module of FIG. 4 is adjusted in the same manner as that described above in connection with the arrangement of FIG. 3 during the calibration procedure. Thus, after the logarithmic amplifiers 86 and 90 have been adjusted to standard counting rates, the drawer 116 is moved inwardly to insert the absorbers 130 and 132 between their respective sources and detectors. The potentiometer 170 is now adjusted until the $\Delta\rho$ galvanometer shows zero output, indicating that the desired 2.6 density point on the spine is reached and then the corrected bulk density galvanometer is electrically adjusted to a reading of 2.6.

When the slide 122 is moved into place, a change in the short spacing detector counting rate is produced which is equivalent to a bulk density change of −0.1 on the spine and the input to the servo amplifier 174 is no longer zero. The arm 178 of the potentiometer 172 is then driven by the servo motor 176 until the input to the servo amplifier 174 is again zero. This means that the arm 180 of the potentiometer 182 is also driven off of its midpoint and hence a correction voltage equal to the voltage developed between the arm 180 and the midpoint tap 190 of the potentiometer 182 is supplied to the correction terminals 193 an 194. In addition, the correction voltage developed between the midpoint 190 and the arm 180 is supplied in series with the output of the long spacing detector amplifier 86 to the corrected bulk density terminals 195 and 196. If the change produced by the slide 122 does not result in a reading of 2.5 on the spine then the rib angle potentiometer 186 is adjusted until exactly the desired value of 2.5 is provided. In this connection it will be understood that the potentiometer 186 varies the current through the potentiometer 182 and hence the voltage developed across any portion of this potentiometer such as the voltage between the midpoint 190 and the arm 180.

In order to provide compensation for rib curvature, the potentiometer 182 is provided with a series of taps 182a along the length thereof. For example, the potentiometer 182, as well as the potentiometer 172, may comprise ten turn potentiometers and the taps 182a may be provided at spaced points on each turn. A series of ten rib curvature compensation resistors 200 to 209, inclusive, are connected across the respective tapped portions of the potentiometer 182. The values of the resistors 200 to 209, inclusive, are chosen so that additional rib curvature compensation will be provided as the amplitude of the correction signal increases with increasing mudcake thickness. Thus, the resistors 204 and 205 adjacent the midpoint of the potentiometer 182 will have smaller values than the resistors 200 and 209 so that less compensation is provided near the midpoint of the potentiometer 182 than at its extremities. It will, of course, be understood that the values of the resistors 200 to 209 will be chosen such as to give the desired average rib curvature compensation for the geometry of a particular logging instrument, as determined from the spine and ribs plot of that particular instrument. It is also pointed out that in the arrangement of FIG. 4, the constant voltage source 184, which is used to produce the correction signal, is decoupled from and independent of the input signals supplied by the rate meters 80 and 82. Accordingly, the correction signal, including the modification thereof for rib curvature, may be highly stabilized for temperature variations and is unaffected by noise and other undesired disturbances on the input signals.

In accordance with a further feature of the invention, a lead shield 43, which may have a thickness of from about one sixteenth of an inch to about one eighth of an inch, is provided between the short spacing detector 26 and the housing 32. The shield 43 has a preferential absorption for gamma rays having energies below about 150 to 200 k.e.v. Since the gamma rays which are scattered over a long path will have lower energy than those scattered over a short path, the effect of the shield 43 is to reduce the depth of investigation of the short spacing detector and to increase the percentage of effect which is contributed by the mudcake or zone closest to the pad unit 12. It has been found that by use of the shield 43 over only the short spacing detector 26, the angle between the spine and rib of a given tool is increased which results in improved accuracy of compensation because changes due to statistical fluctuations represent less density change.

While particular embodiments of the invention have been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. In apparatus for automatically computing a true formation characteristic from first and second input signals representing in a non-linear manner the apparent formation characteristic at two different spacings from a common source, the combination of, means for converting said input signals into signals which are linear with respect to the desired formation characteristic to be recorded, means for comparing said converted signals to produce a correction signal representative of the difference therebetween, means for adjusting the amplitude of one of said converted signals so that said converted signals are equal and said correction signal is zero at a predetermined value of said formation characteristic, and means for adding said correction signal to one of said converted signals to produce a signal representing the true value of said desired formation characteristic.

2. In apparatus for automatically computing a true formation characteristic from first and second input signals representing in a non-linear manner the apparent formation characteristic at two different spacings from a common source, the combination of, temperature compensated logarithmic amplifier means for converting said input signals into signals which are linear with respect to the desired formation characteristic to be recorded, means for comparing converted signals to produce a correction signal representative of the difference therebetween, means for adjusting the amplitude of one of said converted signals so that said converted signals are equal and said correction signal is zero at a predetermined value of said formation characteristic, and means for adding said correction signal to one of said converted signals to produce a signal representing the true value of said desired formation characteristic.

* * * * *